(12) United States Patent
Schorpp et al.

(10) Patent No.: US 10,578,203 B2
(45) Date of Patent: Mar. 3, 2020

(54) DRIVE UNIT

(71) Applicant: Robert Bosch GmbH, Stuttgart (DE)

(72) Inventors: Gerold Schorpp, Au am Rhein (DE); Peter Steuer, Karlsruhe (DE); Siegfried Reichmann, Rheinau Freistett (DE)

(73) Assignee: Robert Bosch GmbH, Stuttgart (DE)

( * ) Notice: Subject to any disclaimer, the term of this patent is extended or adjusted under 35 U.S.C. 154(b) by 475 days.

(21) Appl. No.: 15/321,261

(22) PCT Filed: Jun. 23, 2015

(86) PCT No.: PCT/EP2015/064032
§ 371 (c)(1),
(2) Date: Dec. 22, 2016

(87) PCT Pub. No.: WO2015/197573
PCT Pub. Date: Dec. 30, 2015

(65) Prior Publication Data
US 2017/0159793 A1 Jun. 8, 2017

(30) Foreign Application Priority Data
Jun. 25, 2014 (DE) .................. 10 2014 212 133

(51) Int. Cl.
*F16H 57/021* (2012.01)
*H02K 7/08* (2006.01)
(Continued)

(52) U.S. Cl.
CPC ............. *F16H 57/021* (2013.01); *F16H 1/16* (2013.01); *F16H 57/039* (2013.01); *H02K 7/081* (2013.01); *F16H 2057/0213* (2013.01)

(58) Field of Classification Search
CPC ........ F16H 57/021; F16H 1/16; F16H 57/039; F16H 2057/0213; H02K 7/081
See application file for complete search history.

(56) References Cited

U.S. PATENT DOCUMENTS

| 3,586,399 A | 6/1971 | Muller |
| 3,690,194 A | 9/1972 | Edwards |

(Continued)

FOREIGN PATENT DOCUMENTS

| DE | 10114453 | 9/2002 |
| DE | 102007047369 | 4/2009 |

(Continued)

OTHER PUBLICATIONS

International Search Report for Application No. PCT/EP2015/064032 dated Sep. 28, 2015 (English Translation, 3 pages).

*Primary Examiner* — Zakaria Elahmadi
(74) *Attorney, Agent, or Firm* — Michael Best & Friedrich LLP

(57) ABSTRACT

The invention relates to a drive unit (100), with a bearing device (50) for a drive motor (1) which interacts with a gearing element (13) via a drive shaft (2) which is supported at multiple points, with a first bearing element (3) which is arranged on that side of the drive motor (1) which is opposite the gearing element (13), a second bearing element (4) which is arranged between the drive motor (1) and the gearing element (13), and a third bearing element (20; 20*a* to 20*h*) which is arranged on that side of the gearing element (13) which faces away from the drive motor (1), wherein the third bearing element (20; 20*a* to 20*h*) is arranged movably in a direction perpendicular to the longitudinal axis (21) of the drive shaft (2), and wherein the third bearing element (20; 20*a* to 20*h*) is accommodated in a receptacle (38; 38*a*; 66) of a gearbox (10).

16 Claims, 11 Drawing Sheets

Figure 1:
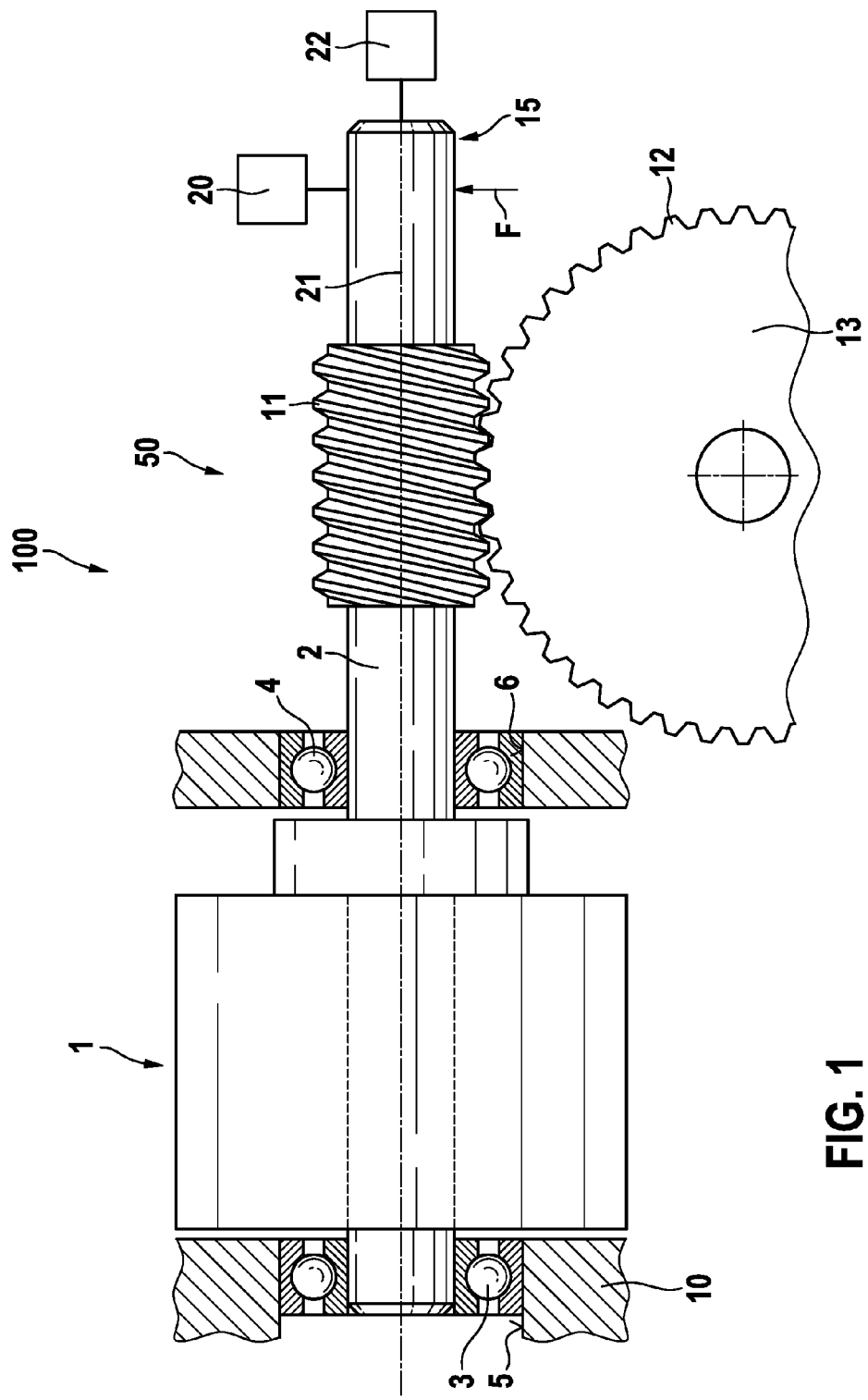

(51) Int. Cl.
*F16H 57/039* (2012.01)
*F16H 1/16* (2006.01)

(56) References Cited

U.S. PATENT DOCUMENTS

| | | | |
|---|---|---|---|
| 9,382,972 B2* | 7/2016 | Kwon | F16H 1/26 |
| D772,125 S * | 11/2016 | Huang | D12/177 |
| 2005/0150372 A1* | 7/2005 | Nguyen | B62D 3/123 |
| | | | 91/508 |
| 2010/0079020 A1* | 4/2010 | Tang | F16H 1/16 |
| | | | 310/83 |
| 2011/0155499 A1* | 6/2011 | Wilkes | B62D 5/0409 |
| | | | 180/444 |
| 2012/0125132 A1* | 5/2012 | Bernhard | B62D 5/0409 |
| | | | 74/89.14 |
| 2013/0133974 A1* | 5/2013 | Hamakita | B62D 5/0403 |
| | | | 180/444 |
| 2013/0206497 A1* | 8/2013 | Fuechsel | B62D 5/0409 |
| | | | 180/444 |
| 2014/0083794 A1* | 3/2014 | Ishii | B62D 5/0409 |
| | | | 180/444 |
| 2015/0217804 A1* | 8/2015 | Moriyama | F16D 3/68 |
| | | | 180/444 |
| 2015/0266506 A1* | 9/2015 | Sato | B62D 5/0421 |
| | | | 180/444 |
| 2015/0300479 A1* | 10/2015 | Frank | F16H 57/021 |
| | | | 324/207.2 |
| 2016/0031473 A1* | 2/2016 | Riepold | B62D 5/0409 |
| | | | 74/425 |
| 2016/0072427 A1* | 3/2016 | Wu | H02S 20/32 |
| | | | 74/380 |
| 2016/0097424 A1* | 4/2016 | Hafermalz | F16H 57/039 |
| | | | 74/425 |
| 2016/0236707 A1* | 8/2016 | Oberle | F16H 57/021 |

FOREIGN PATENT DOCUMENTS

| | | |
|---|---|---|
| DE | 102010064295 | 7/2012 |
| DE | 102012208972 | 6/2013 |
| WO | 0138944 | 5/2001 |
| WO | 2009052768 | 4/2009 |

* cited by examiner

DRIVE UNIT

BACKGROUND OF THE INVENTION

The invention relates to a drive unit.

A drive unit is known from DE 10 2010 064 295 A1 belonging to the applicant. The known drive unit is part of a comfort drive in a motor vehicle, such as, for example, in a power window drive, a sliding roof drive, a seat adjustment drive. In particular, the known drive unit has a first and a second bearing element on both sides of a drive motor in order to support a drive shaft. The drive shaft interacts with a worm toothing having a mating toothing of a gear wheel designed as a spur gear. A third bearing element is provided on that side of the gear wheel which faces away from the drive motor, the bearing element serving to absorb or to support forces which act transversely with respect to the longitudinal axis of the drive shaft and lead to a deflection of the drive shaft. For this purpose, the known drive unit or the third bearing element thereof has a portion which engages around the drive shaft at the circumference thereof preferably with radial play and is connected via a flexible intermediate portion to a bearing region arranged in a receptacle of a gear housing. As seen overall, the single-part third bearing element is of sleeve-shaped design with a passage opening for receiving the end region of the drive shaft. It is disadvantageous in the case of the drive unit known from the document mentioned that the third bearing element, for the mounting thereof, requires a relatively large amount of space in the gear housing since the third bearing element, as seen over its entire circumference, is arranged in a corresponding receptacle of the gear housing. Furthermore, the required space for receiving the third bearing element restricts the construction space or the possibility of an axial support for the end region of the drive shaft or makes such an axial support no longer possible. It should furthermore be considered to be particularly disadvantageous that, in the event of radial play between the circumference of the drive shaft and the third bearing element, a periodic contact or striking of the circumferential surface of the drive shaft against the third bearing element occurs, typically because of component tolerances, which may be perceived as an annoying noise.

SUMMARY OF THE INVENTION

Starting from the depicted prior art, the invention is based on the object of developing a drive unit in such a manner that said drive unit firstly requires as little construction space as possible for receiving the third bearing element in the gear housing and secondly permits a reduced noise emission and also, in addition, as simple an arrangement as possible of a device for axially supporting the drive shaft. This object is achieved according to the invention in the case of a drive unit in that the receptacle for the third bearing element, which serves for the lateral support of the drive shaft, in the gear housing is arranged with respect to the drive shaft laterally next to the drive shaft in a partial region in the circumferential direction of the drive shaft, and in that the third bearing element has a contact element which is in constant bearing contact with the drive shaft.

Expressed in other words, this means that, by means of the special design of the third bearing element, the latter has to be arranged only on a single lateral region in a receptacle of the gear housing, and therefore, in contrast to the prior art, it is no longer required in the gear housing to form a receptacle for the third bearing element, the receptacle completely encircling the drive shaft in the circumferential direction. As a result, in particular, additional installation space for an axial support for the drive shaft is created. Furthermore, by means of the constant contact of the third bearing element against the drive shaft, it is ensured that no noises can arise because of the drive shaft lying or being in contact merely temporarily against or with the third bearing element.

In a first structural refinement of the contact element of the third bearing element, which contact element is arranged in operative connection with the drive shaft, it is provided that the contact element has a flat contact surface on the side facing the drive shaft in such a manner that the contact surface lies linearly against the drive shaft in the direction of the longitudinal axis of the drive shaft. Such a design of the contact surface of the third bearing element makes it possible, for example, to insert the third bearing element only after the drive shaft is installed in the gear housing, thus resulting in greater flexibility in respect of different possibilities of installing the drive unit.

Alternatively, however, it is also possible that the contact element of the third bearing element has, on the side facing the drive shaft, a contact surface which is curved concavely or is provided with a radius in such a manner that the contact surface lies against the drive shaft in the circumferential direction of the drive shaft. Such a design of the contact surface of the third bearing element permits an improved or increased contact of the drive shaft against the contact surface of the third bearing element.

In order to ensure that the third bearing element is arranged with its contact element in constant bearing contact with the drive shaft, it is provided that the contact element is connected by at least one elastic intermediate element to a bearing portion of the third bearing element, in that the bearing portion is arranged in a form-fitting or clamping-fitting manner in the receptacle of the gear housing, and in that the intermediate element produces a contact force on the contact element in the direction of the drive shaft. The third bearing element therefore has three different functional regions: firstly, the contact element which is in constant contact with the drive shaft, secondly, the intermediate element which produces the required contact force for the contact element against the drive shaft, and, thirdly, the bearing portion which is arranged in the receptacle of the gear housing. This structural splitting of the third bearing element into three functional regions makes it possible to optimally adapt the respective functional region to its respective task.

In order to avoid excessive deflections of the drive shaft such that damage to the drive unit can be eliminated, it is provided that the contact element interacts with a stop which limits the deflection of the contact element in a direction perpendicularly to the longitudinal axis of the drive shaft. The stop therefore serves to protect the parts of the drive unit, and therefore the functionality of the drive unit is ensured up to the maximum deflection of the drive shaft, at which the contact element interacts with the stop.

In a first structural refinement of the stop, it is provided that the stop is formed on the third bearing element itself. Alternatively, it is, however, also conceivable, in a second structural refinement, that the stop is formed on the gear housing.

In order to produce the required contact force of the contact element against the drive shaft, it is provided, in a first structural refinement, that the at least one intermediate element extends substantially in a direction running perpendicularly to the longitudinal axis of the drive shaft. Such an arrangement or design of the intermediate element has in particular the advantage of a construction space, which is minimized in the direction of the drive shaft, for the third bearing element, which, for example, facilitates the arrangement of a device for absorbing axial forces of the drive shaft.

Alternatively, it is, however, also conceivable for the at least one intermediate element to extend substantially in a direction running parallel to the longitudinal axis of the drive shaft. Such an arrangement or design of the intermediate element has the advantage of an improved spring action of the contact element since as a result, without increasing the construction space of the gear housing in a direction running perpendicularly to the longitudinal axis of the drive shaft, the possibility is afforded of forming the intermediate element, for example, with a relatively large length.

In order always to permit secure contact of the contact element of the third bearing element against the drive shaft for the entire region of the possible deflection of the drive shaft, it is provided that the gear housing has guide regions, which are formed by wall portions, for the contact element, which guide regions extend perpendicularly to the longitudinal axis of the drive shaft and, with the formation of a clearance fit, interact with side walls of the contact element.

In a preferred structural refinement of the gear housing receiving the third bearing element, it is provided that the gear housing has a basic element which is preferably of shell-shaped design and in which the receptacle for the bearing device is formed, and in that the region of the receptacle is covered by means of a cover element which is connectable to the basic element and lies against the bearing element in regions. In particular, the contact of the cover element takes place at least against the bearing portion of the third bearing element in order to ensure a defined arrangement of the bearing portion of the third bearing element in the gear housing.

The third bearing element can be produced particularly simply and cost-effectively if said bearing element is designed as a single-part plastics injection molded part. Alternatively, it is, however, also conceivable for the third bearing element to be formed integrally and to be composed of a rubber-elastic material.

It is preferred to provide a design of the drive unit with a supporting device which acts on an end surface of the drive shaft and force-actuates the drive shaft in the direction of the gear element.

A drive unit according to the invention is preferably used in a comfort drive in a motor vehicle, such as a power window drive, a sliding roof drive, a seat adjustment drive or the like. Such a comfort drive has in particular the advantage of low noise emissions and a particularly compact construction.

Figure 2:
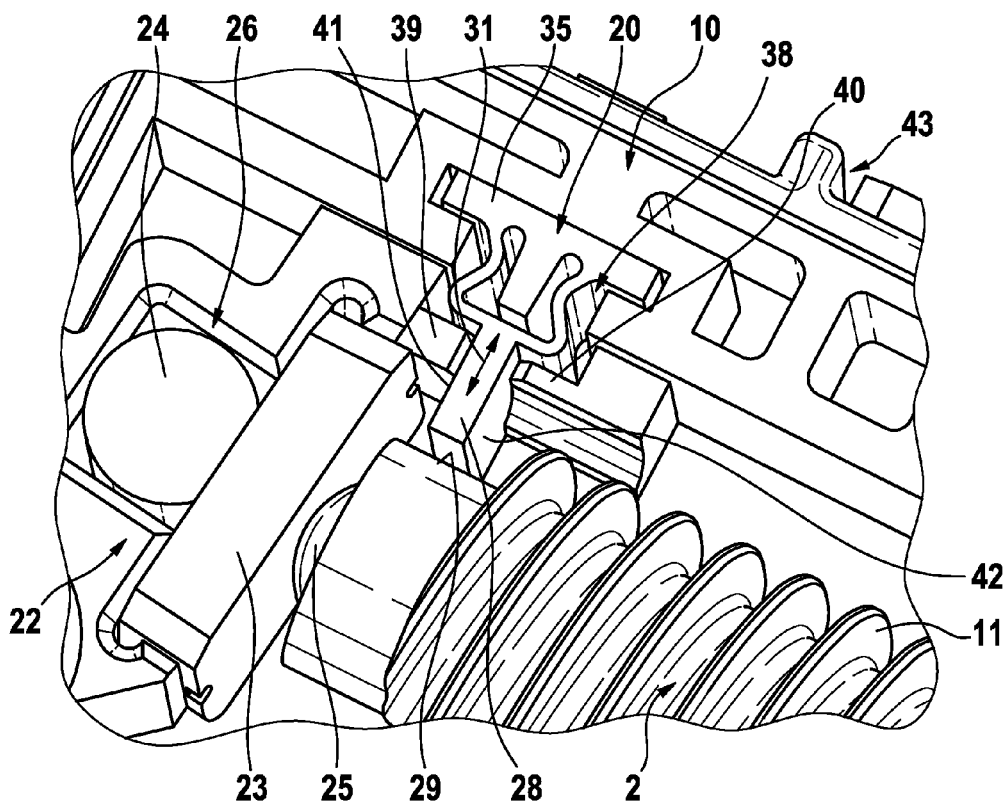
Figure 3:
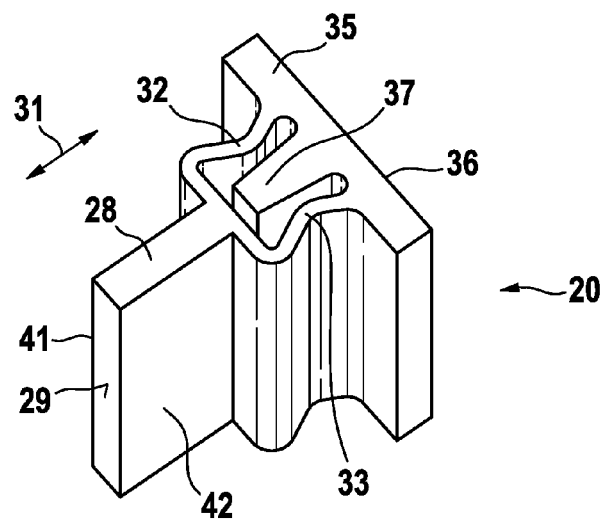
Figure 4:
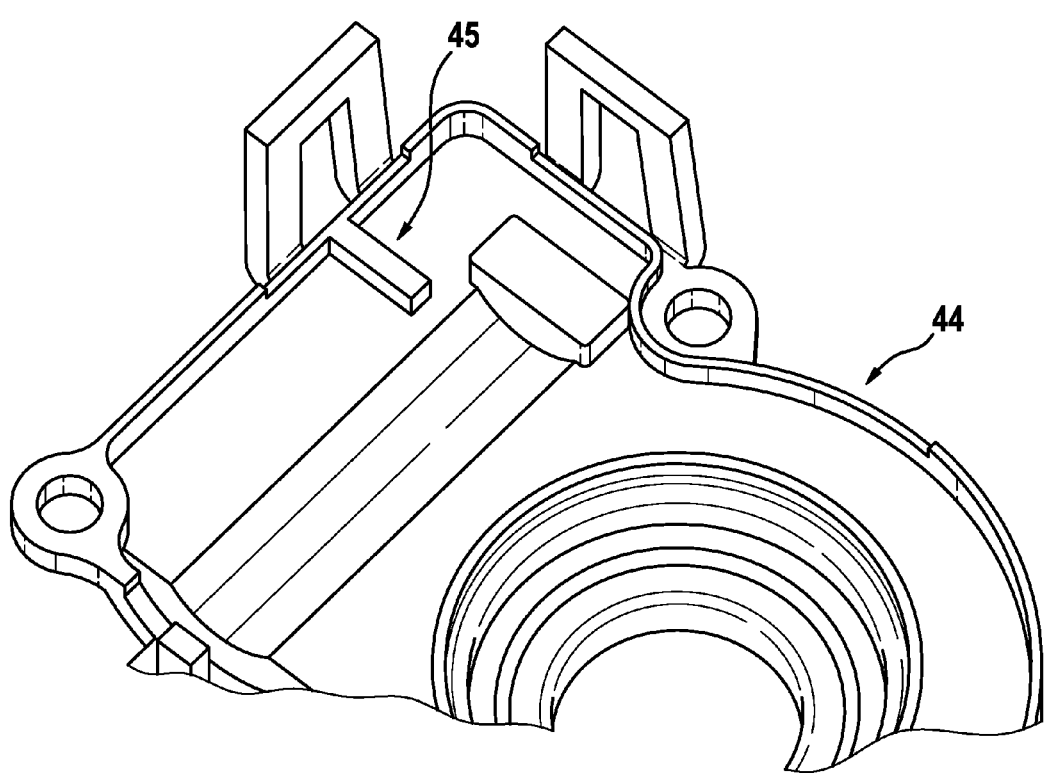
Figure 5:
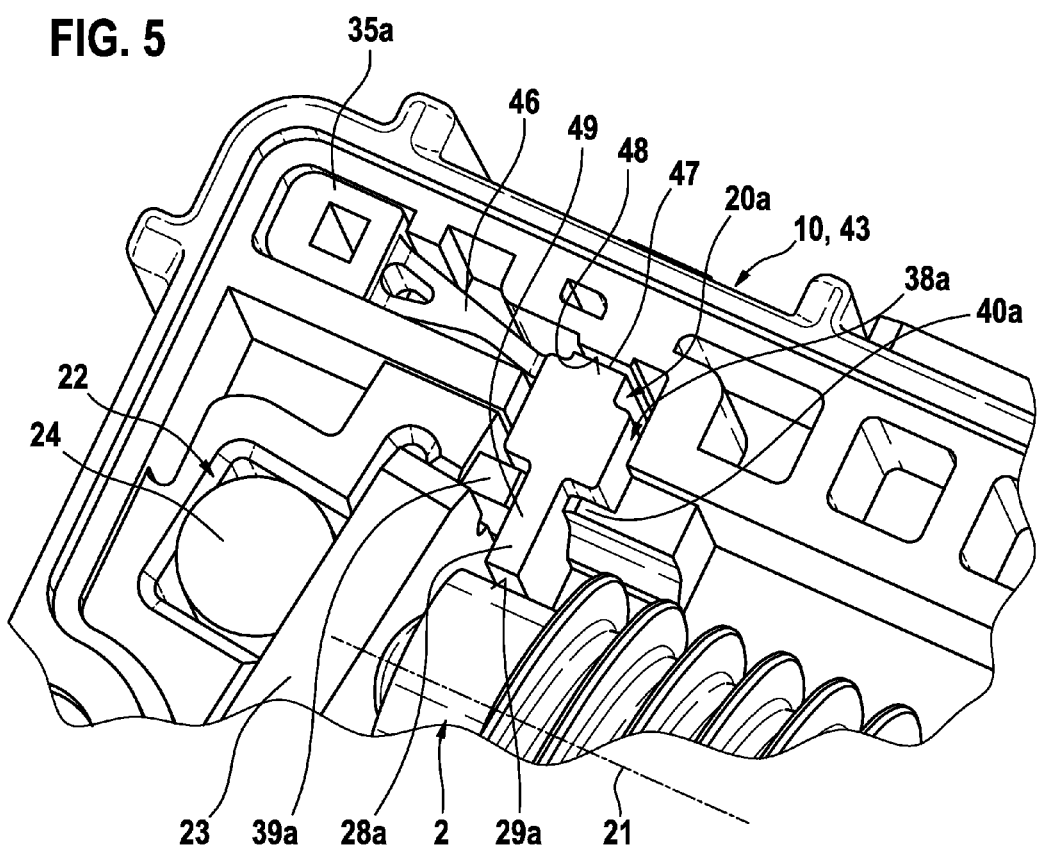
Figure 6:
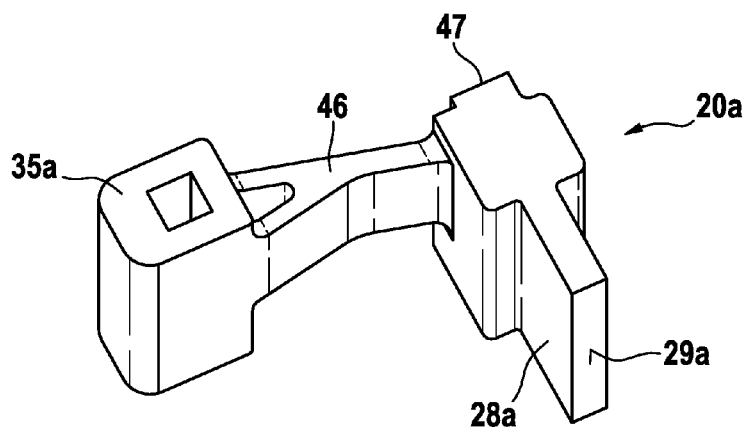
Figure 7:
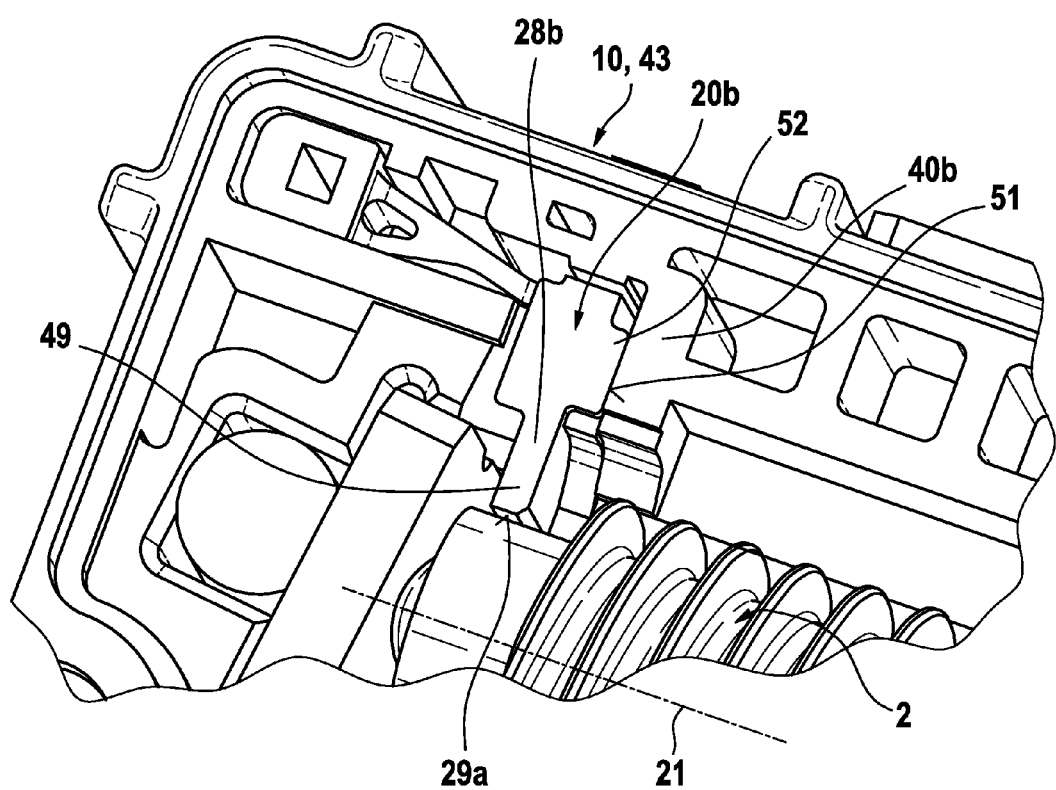
Figure 8:
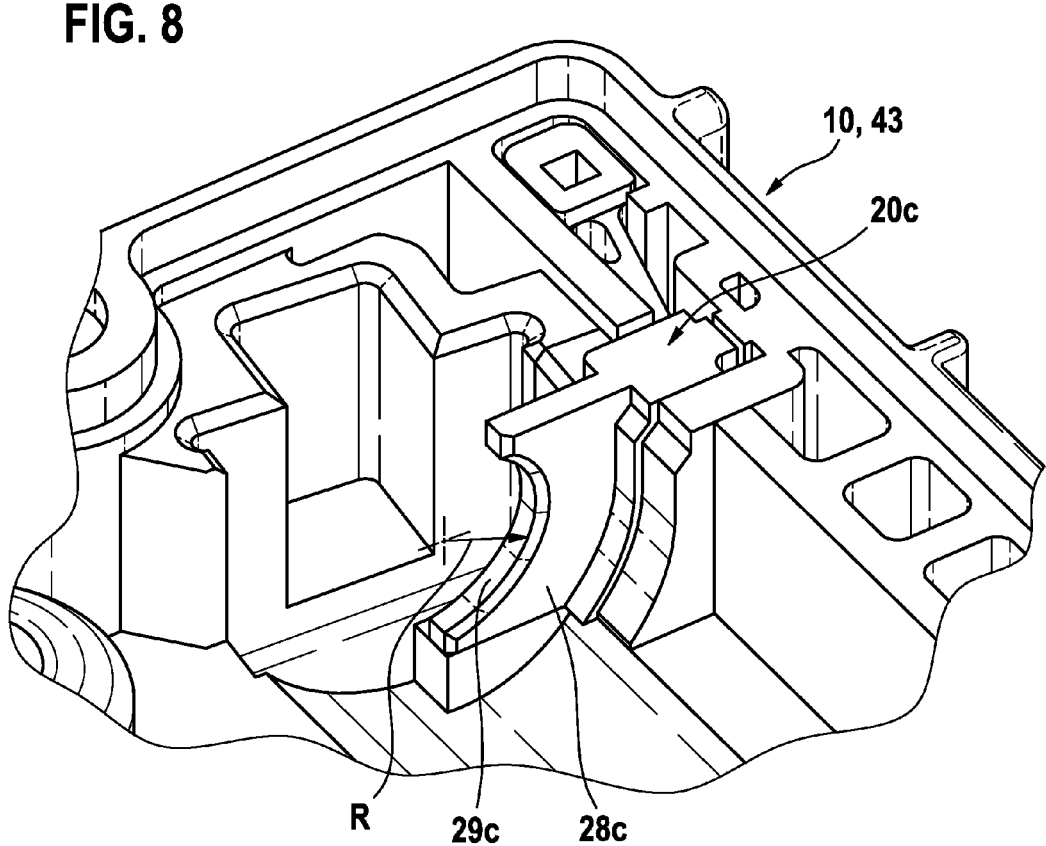
Figure 9:
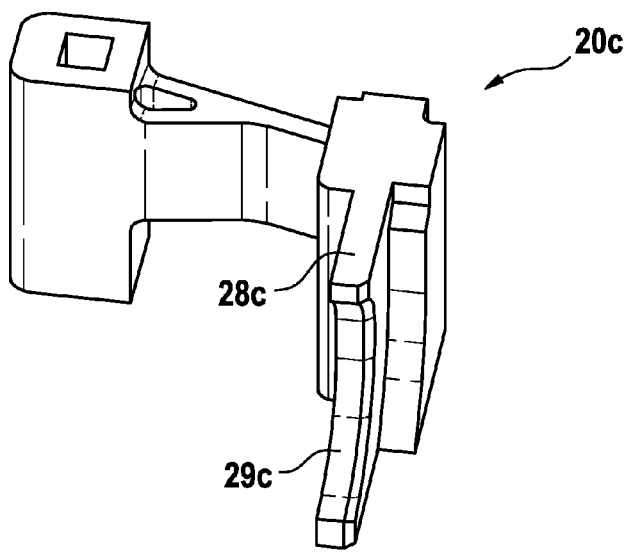
Figure 10:
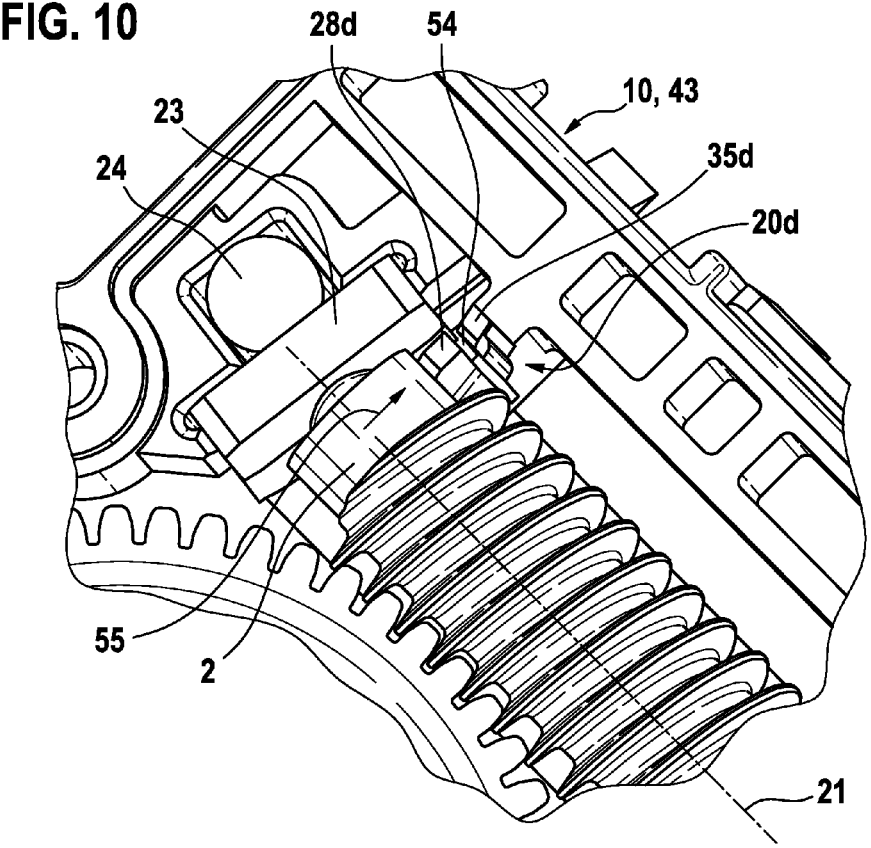
Figure 11:
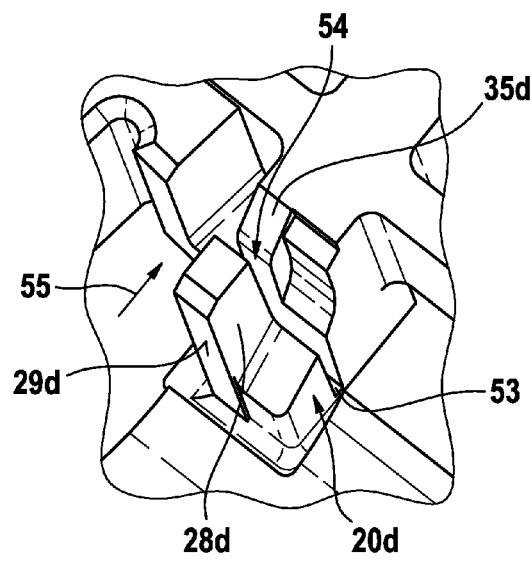
Figure 12:
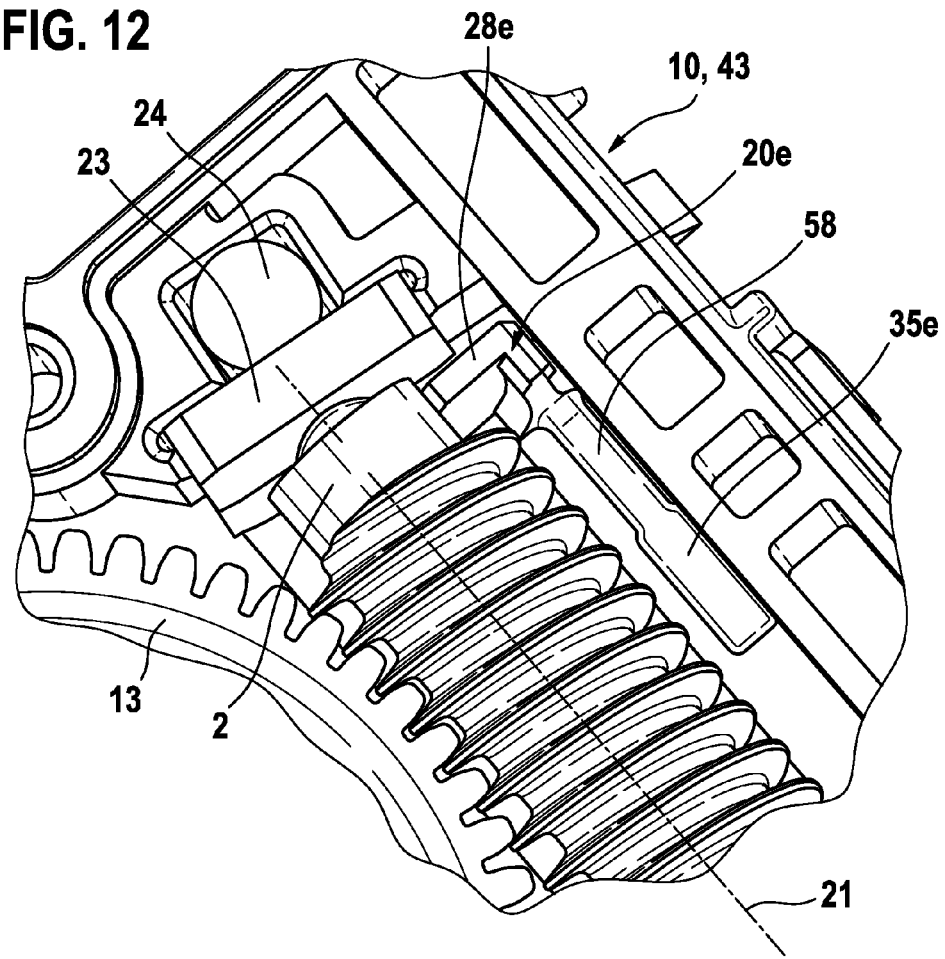
Figure 13:
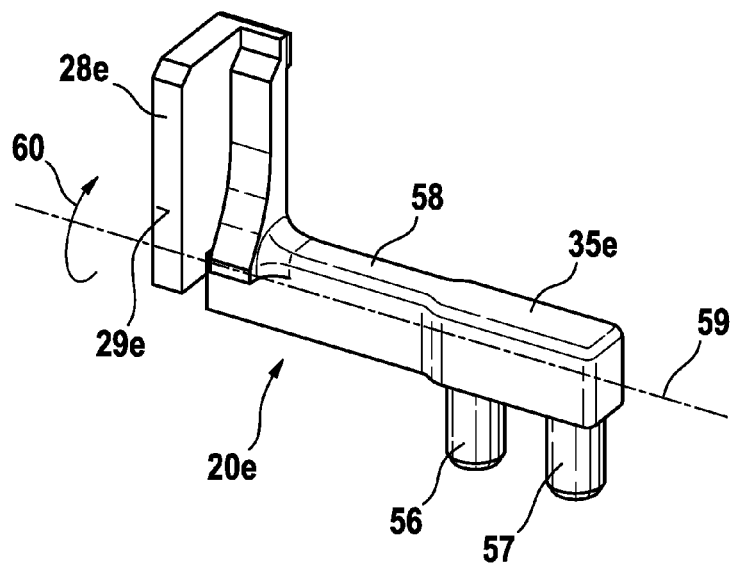
Figure 14:
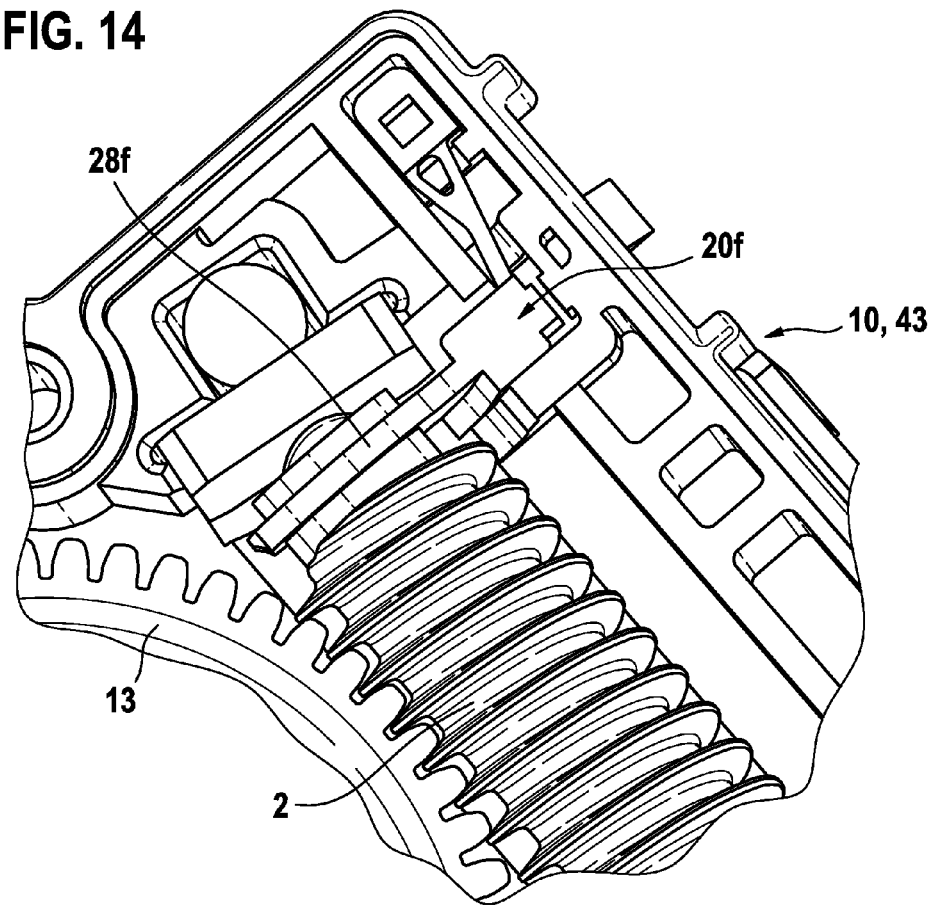
Figure 15:
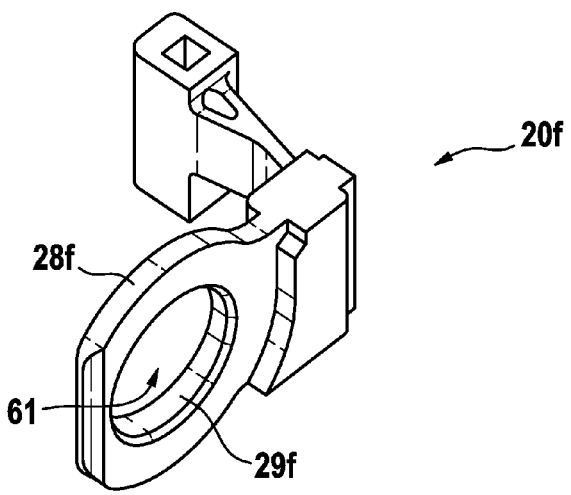
Figure 16:
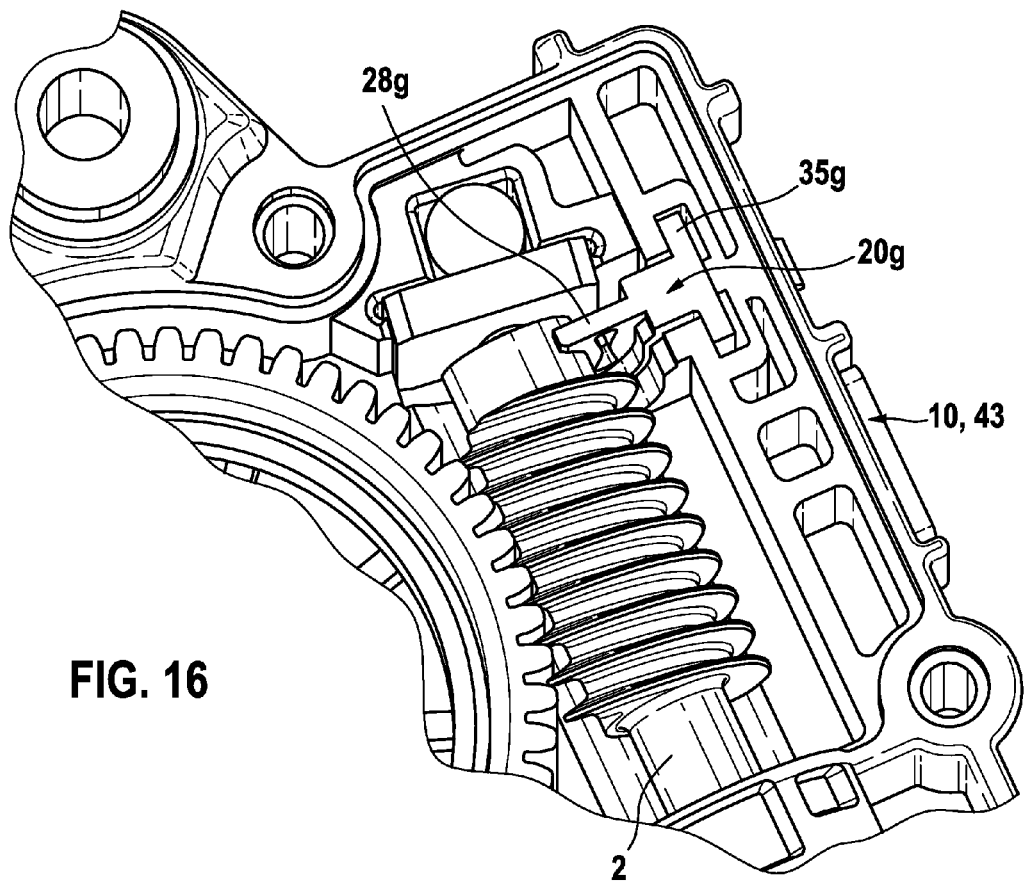
Figure 17:
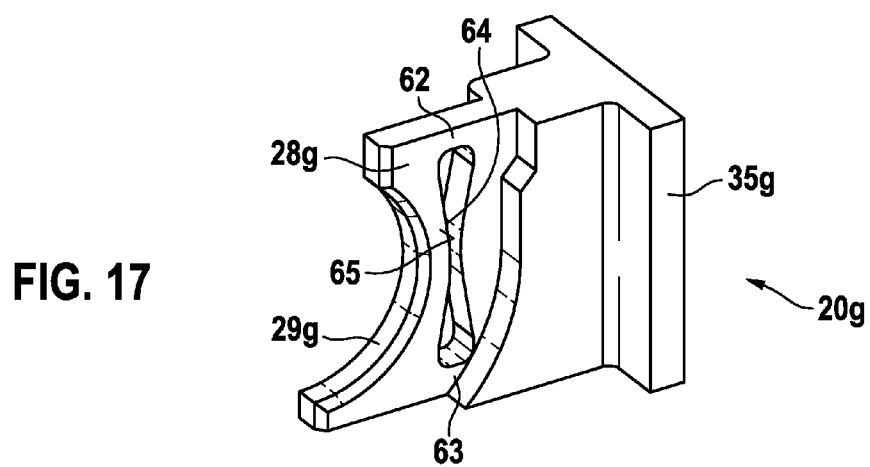
Figure 18:
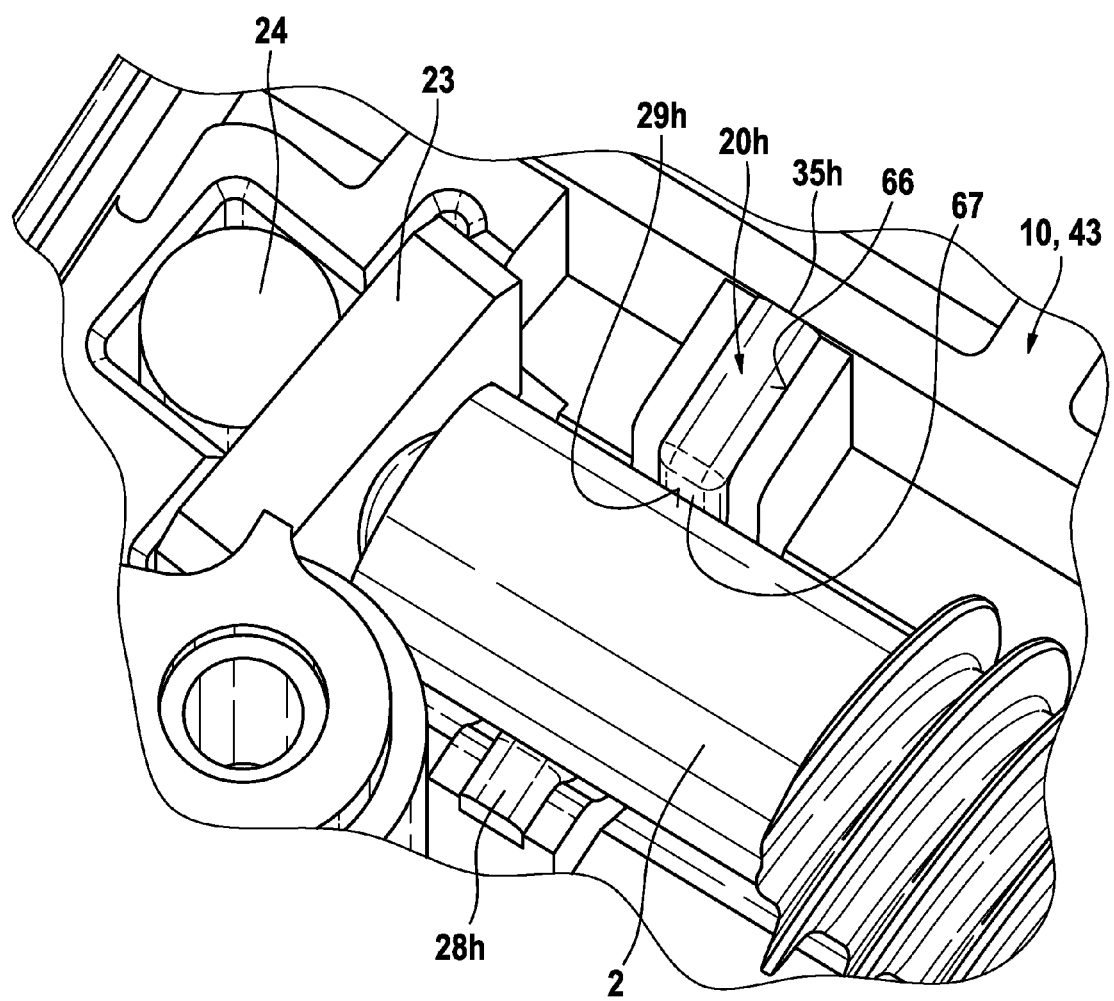

Further advantages, features and details of the invention emerge from the description below of preferred exemplary embodiments and with reference to the drawing, in which:

FIG. 1 shows a drive unit according to the invention in a simplified, partially sectioned side view, FIG. 2 shows a partial region of the drive unit according to FIG. 1 in a perspective view of a first embodiment of a bearing device according to the invention, FIG. 3 shows a third bearing unit used in the drive unit according to FIG. 2, in a perspective individual illustration, FIG. 4 shows a gear cover used in the drive unit according to FIG. 2, in a perspective illustration, FIG. 5 shows a second embodiment of a bearing device according to the invention in a gear housing, in a perspective illustration, FIG. 6 shows a third bearing element of the bearing device according to FIG. 5 in a perspective individual illustration, FIG. 7 shows a third embodiment of a bearing device according to the invention in the gear housing in a perspective illustration, FIG. 8 shows a fourth bearing device according to the invention in the installed state in the gear housing in a perspective illustration, FIG. 9 shows the third bearing element, as is used in the bearing device of FIG. 8, in a perspective individual illustration, FIG. 10 shows a fifth embodiment of a bearing device according to the invention in the installed state in a gear housing, in a perspective illustration, FIG. 11 shows the installation location of the third bearing element in the drive unit according to FIG. 10 in an enlarged, perspective individual illustration, FIG. 12 shows a sixth bearing device according to the invention in a gear housing, in a perspective illustration, FIG. 13 shows a third bearing element provided in FIG. 12, in a perspective individual illustration, FIG. 14 shows a seventh embodiment of a bearing device according to the invention in a gear housing, in a perspective illustration, FIG. 15 shows a third bearing element as is used in the bearing device according to FIG. 14, in a perspective individual illustration, FIG. 16 shows an eighth design according to the invention of a bearing device in a gear housing, in a perspective illustration, FIG. 17 shows a third bearing device as is used in FIG. 16, in a perspective individual illustration, and FIG. 18 shows a ninth bearing device according to the invention using a third bearing element, which is composed of a rubber-elastic material, in a gear housing, in a perspective illustration.

DETAILED DESCRIPTION

Identical elements or elements having the same function are provided with the same reference numbers in the figures.

FIG. 1 illustrates the basic construction of a drive unit 100 according to the invention in highly simplified form, in the manner in which said drive unit serves as part of a comfort drive in a motor vehicle. A comfort drive is understood here within the context of the invention by way of example, and not in a limiting manner, to mean a power window drive, a sliding roof drive, a seat adjustment drive or the like.

The drive unit 100 has a drive motor 1 which is designed as an electric motor and has a drive shaft 2 projecting out of the housing of the drive motor 1. The drive shaft 2 of the drive motor 1 is mounted on both sides of the drive motor 1 in a first and second bearing element 3, 4 which are preferably designed as a ball bearing or plain bearing. In the exemplary embodiment illustrated in FIG. 1, the two bearing elements 3, 4 are accommodated or arranged in a respective recess 5, 6 in a gear housing 10, only illustrated in regions in FIG. 1. However, it is, of course, also possible, in a modification of the illustration of FIG. 1, to flange-mount the drive motor 1 onto a corresponding gear housing 10 by means of an end side of the drive motor 1, wherein the two bearing elements 3, 4 are then arranged, for example, in a motor housing of the drive motor 1.

On that side of the second bearing element 4 which faces away from the first bearing element 3, the drive shaft 2 has a portion with a toothing 11 in the form of a worm toothing.

The toothing 11 interacts with a mating toothing 12 of a gear device, partially illustrated, in the form of a gear wheel 13 which is designed in the form of a spur gear and which is composed of plastic. The gear wheel 13 serves for transmitting a torque produced by the drive motor 1 to an element, not illustrated, that is to be adjusted, for example a window or a sliding roof.

That end region 15 of the drive shaft 2 which faces away from the drive motor 1 interacts with a third bearing element 20 as supporting element which is designed to limit the deflection of the end region 15 of the drive shaft 1, which deflection is caused by a force F between the toothing 11 and the mating toothing 12, in a direction running perpendicularly to the longitudinal axis 21 of the drive shaft 2 and pointing away from the gear wheel 13. The bearing device 50 of the drive unit 100, serving for the mounting of the drive shaft 2, therefore has the three bearing elements 3, 4 and 20. Furthermore, the end region 15 of the drive shaft 2 interacts with a supporting device 22 which absorbs or supports longitudinal forces acting on the supporting device 22 in the direction of the longitudinal axis 21. For this purpose, as can be seen in particular with reference to the illustration of FIG. 2, the supporting device 22 has a supporting plate 23 which is preferably composed of metal and which supports the drive shaft 2 in the axial direction via an elastic element 24 in the form, for example, of a cylindrical rubber element, wherein the supporting plate 23 is arranged in bearing contact with the shaft end 25, which is preferably of spherical design. The supporting device 22 is arranged in a receiving space 26 of the gear housing 10.

FIGS. 2 and 3 illustrate the third bearing element 20 of the bearing device 50 in a first embodiment of the invention in more detail. In particular, it is seen that the third bearing element 20, which is composed of plastic, is formed integrally and is produced by injection molding, substantially consists of three regions: the first region is formed by a block-shaped contact element 28 which has a flat contact surface 29 on the side facing the drive shaft 2. The contact element 28 is connected to a bearing portion 35 via two intermediate elements 32, 33 which are arranged parallel to each other and are elastically deformable in the direction of the double arrow 31. The bearing portion 35 which is of substantially plate-like design has, perpendicularly to a rear side 36, a stop element 37 which is designed in the shape of a web and limits the deflection of the contact element 28 in the direction toward the bearing portion 35, i.e. perpendicularly to the longitudinal axis 21 of the drive shaft 2, wherein the stop element 37 is arranged in alignment with the contact element 28.

The bearing portion 35 is accommodated at least in regions in a form- or clamping-fitting manner in a receptacle 38 of the gear housing 10 laterally and next to the drive shaft 2 over a partial region of the drive shaft 2, as viewed in the circumferential direction thereof. By contrast, the two intermediate elements 32, 33 are arranged with play in the receptacle 38 in order to permit deformation of the intermediate elements 32, 33. The receptacle 38 has wall portions 39, 40 which serve as guide regions and interact via a clearance fit with side walls 41, 42 of the contact element 28 and which, in the event of a deflection of the contact element 28 in the direction of the stop element 37, bring about guidance of the contact element 28 in a direction running perpendicularly to the longitudinal axis 21 of the drive shaft 2.

It is essential for the contact element 28 that the arrangement of the third bearing element 20 in the receptacle 38 is such that the contact element 28 is acted upon via the two intermediate elements 32, 33 against the circumference of the drive shaft 2 with a contact force such that the contact element 28 is always in bearing contact by means of its contact surface 29 with the circumferential surface of the drive shaft 2. The contact takes place linearly here over the width of the contact surface 29 parallel to the longitudinal axis 21 of the drive shaft 2.

The receptacle 38 for the third bearing element 20 is formed in a basic element 43, which is preferably of shell-shaped design, of the gear housing 10, which is likewise preferably produced in the plastic injection molding process. In order, in the installed state of the third bearing element 20, to position or to secure the third bearing element 20 in the receptacle 38, the basic element 43 is covered at least in the region of the third bearing element 20 by a cover element 44 which can be seen in FIG. 4. The cover element 44 has a strip-shaped supporting body 45 which, in the mounted state of the gear housing 10, lies with the basic element 43 against the upper side of the bearing portion 35 and therefore positions or fixes said bearing portion in the receptacle 38.

FIGS. 5 and 6 illustrate a modified third bearing element 20a which differs from the bearing element 20 in that the contact element 28a and the bearing portion 35a are connected via a single intermediate element 46. In contrast to the two intermediate elements 32, 33 of the third bearing element 20, the intermediate element 46, in the installed state in the gear housing 10, extends substantially in a direction running parallel to the longitudinal axis 21 of the drive shaft 2 such that the receptacle 38a in the gear housing 10 also extends substantially parallel to the longitudinal axis 21 of the drive shaft 2 (in contrast to the receptacle 38 for the third bearing element 20). In this case, a part of the receptacle 38 runs laterally next to the supporting device 22. The contact element 28a also has a flat contact surface 29a for contact against the circumferential surface of the drive shaft 2 and is force-actuated by the intermediate element 46 in the direction of the drive shaft 2 in such a manner that constant contact of the contact surface 28a against the drive shaft 2 is made possible. On the side facing away from the contact surface 29a, the contact element 28a has a flat rear side 47 which interacts with a stop surface 48, which is formed by a partial region of the receptacle 38a, in order to limit the movement of the contact element 28a during a deflection of the drive shaft 2.

The third bearing element 20b of FIG. 7 is formed at least substantially identically to the third bearing element 20a according to FIGS. 5 and 6. Differences arise merely in the (lateral) guidance of the contact elements 28a, 28b. Whereas, in the case of the contact element 28a according to FIG. 5, the guidance of the contact element 28a takes place in the region of a web-shaped region 49 of relatively narrow design on wall portions 39a, 40a of the receptacle 38a, the guidance of the contact element 28b takes place via an enlarged region of the contact element 28b, which region runs in a perpendicular direction to the longitudinal axis 21. For this purpose, for example, the one side surface 51 of the contact element 28b is of extended design and reaches both over the region 49 and over a region 52 which is designed to be wider than the region 49. The side surface 51 interacts with a wall portion 40b which is widened in relation to the wall portion 40a.

FIGS. 8 and 9 illustrate a third bearing element 20c which differs from the bearing element 20a or 20b essentially in that the contact element 28c has a contact surface 29c which is of concave design or is provided with a radius R and lies in regions in the circumferential direction against the drive shaft 2, for example over an angular range of approx. 150°. The contact surface 29c therefore engages around the circumferential surface of the drive shaft 2 in a form-fitting manner in regions and therefore also secures or supports the drive shaft 2 in a direction running perpendicularly to the deflection of the drive shaft 2 in the event of a deflection of the drive shaft 2. In comparison to the flat contact surfaces 29, 29a, the contact surface 29c therefore lies over a larger region against the circumferential surface of the drive shaft 2.

The third bearing element 20d, which is illustrated in FIGS. 10 and 11, is of substantially block-shaped design. It can either be integrally formed on the gear housing 10, if the gear housing 10 is composed of a suitable material, or else can be designed as a separate component. In this case, said bearing element is likewise arranged in a corresponding receptacle of the gear housing 10. The third bearing element 20d has two respectively block-shaped portions, which interact with each other, in the form of a contact element 28d and a bearing portion 35d which are connected integrally to each other via an elastic intermediate element 53 of web-like design. A spring gap 54 is formed between the contact element 28d and the bearing portion 35d and permits a movement of the contact element 28d in the direction of the arrow 55 until the contact element 28d lies against the bearing portion 35d. That contact surface 29d of the contact element 28d which faces away from the bearing portion 35d is likewise of flat design, wherein the contact element 28d always lies under prestress against the circumferential surface of the drive shaft 2.

The third bearing element 20e, which is illustrated in FIGS. 12 and 13, extends with its bearing portion 35 next to the drive shaft 2 likewise substantially parallel to the longitudinal axis 21 of the drive shaft 2. The bearing portion 35e has two pin-shaped extensions 56, 57 which can be anchored in corresponding openings or holes in the gear housing 10. The bearing portion 35e is connected via a cylindrical intermediate element 58 to the contact element 28e. The contact element 28e in turn has a flat contact surface 29e for constant contact with the circumferential surface of the drive shaft 2. It is essential that the third bearing element 20e is designed in the form of a torsion spring in which, in the event of a deflection of the contact element 28e, the latter is pivoted about a longitudinal axis 59 of the intermediate element 58 in the direction of the arrow 60. Constant contact of the contact surface 29e against the drive shaft 2 is also ensured here by a corresponding shaping or design of the third bearing element 20e.

The third bearing element 20f which is illustrated in FIGS. 14 and 15 is formed substantially in analogy to the third bearing element 20d according to FIGS. 8 and 9. In contrast thereto, said third bearing element 20f has a contact element 28f with a through-opening 61, wherein the wall bounding the through opening 61 at the same time forms the contact surface 29f. The diameter of the through opening 61 is in particular coordinated as precisely as possible with the outside diameter of the drive shaft 2 in the contact region of the contact surface 29f in such a manner that there is only a clearance fit between the through opening 61 and the circumference of the drive shaft 2, said clearance fit enabling easy installation of the third bearing element 20f on the drive shaft 2. By means of a corresponding arrangement of the third bearing element 20f, it is also ensured here that the contact surface 29f is always in bearing contact with the circumferential surface of the drive shaft 2.

The third bearing element 20g, which is illustrated in FIGS. 16 and 17, corresponds approximately to the third bearing element 20a of FIGS. 2 and 3. However, in contrast thereto, the contact surface 29g of the contact element 28g is likewise formed with a radius, and therefore said contact element lies in regions against the drive shaft 2 in regions in the circumferential direction thereof. A lower and an upper region of the contact element 28g are connected via elastic intermediate elements 62, 63 to the bearing portion 35g. The rear side 64 of the contact element 28g, which rear side faces away from the contact surface 29, is arranged spaced apart from a stop surface 65 of the bearing portion 35g, wherein the rear side 64 lies against the stop surface 65 in the event of an excessive deflection of the drive shaft 2.

Finally, FIG. 18 illustrates a third bearing element 20h which is arranged in a slot-shaped receptacle 66 of the gear housing 10. It is essential here that the third bearing element 20h is composed of a rubber-elastic material. The third bearing element 20h has a contact surface 29h which is provided with a radius and lies in regions against the circumferential surface of the drive shaft 2. The region of the contact surface 29h at the same time forms the contact element 28h, while the region of the third bearing element 20h, which is located within the receptacle 66, forms the bearing portion 35h. The material of the third bearing element 20h, which material is located between the contact surface 29h and the receptacle 66, at the same time forms the elastic intermediate element 67, wherein the contact surface 29h always lies (in regions) against the circumferential surface of the drive shaft 2.

The drive unit 100 provided with the third bearing element 20, 20a to 20h may be modified in diverse ways without departing from the inventive concept.

The invention claimed is:

1. A drive unit (100), comprising a bearing device (50) for a drive motor (1) which interacts via a drive shaft (2), which is mounted at multiple points, with a gear element (13), comprising a first bearing element (3) which is arranged on a side of the drive motor (1) which is opposite the gear element, a second bearing element (4) which is arranged between the drive motor (1) and the gear element (13), and a third bearing element (20; 20a to 20h) which is arranged on a side of the gear element (13) which faces away from the drive motor (1), wherein the third bearing element (20; 20a to 20h) is arranged movably in a direction perpendicular to a longitudinal axis (21) of the drive shaft (2), and wherein the third bearing element (20; 20a to 20h) is accommodated in a receptacle (38; 38a; 66) of a gear housing (10), characterized in that the receptacle (38; 38a; 66) for the third bearing element (20; 20a to 20h) in the gear housing (10) is arranged with respect to the drive shaft (2) laterally next to the drive shaft (2) in a partial region in a circumferential direction of the drive shaft (2), and in that the third bearing element (20; 20a to 20h) has a contact element (28; 28a to 28h) which is arranged in constant bearing contact with the drive shaft (2), wherein the contact element (28; 28a; 28b; 28d; 28e) interacts with a stop (37; 48; 65) which limits a deflection of the contact element (28; 28a; 28b; 28d; 28e) in a direction running perpendicularly to the longitudinal axis (21) of the drive shaft (2), characterized in that the drive shaft (2) has toothing (11) mating with toothing (12) on the gear wheel (13), and wherein a supporting element in the form of a third bearing element (20, 20a to 20h) is configured to limit deflection of an end region (15) of the drive shaft (2), the deflection caused by a force F between the toothing (11) and the toothing (12), in a direction running perpendicularly to the longitudinal axis (21) of the drive shaft (2) and pointing away from the gear wheel (13).

2. The drive unit as claimed in claim 1, characterized in that the contact element (28; 28a; 28b; 28d; 28e) has a flat contact surface (29; 29a; 29b; 29d; 29e) on a side facing the drive shaft (2) in such a manner that the contact surface (29; 29a; 29b; 29d; 29e) lies linearly against the drive shaft (2) in a direction of the longitudinal axis (21) of the drive shaft (2).

3. The drive unit as claimed in claim 1, characterized in that the contact element (28c; 28f; 28g; 28h) has, on a side facing the drive shaft (2), a contact surface (29c; 29f; 29g; 29h) which is curved concavely or is provided with a radius (R) in such a manner that the contact surface (29c; 29f; 29g; 29h) lies against the drive shaft (2) in the circumferential direction of the drive shaft (2).

4. The drive unit as claimed in claim 1, characterized in that the contact element (28; 28a; 28b; 28d; 28e) is connected by at least one elastic intermediate element (32, 33; 46; 53; 58; 62, 63; 67) to a bearing portion (35; 35a; 35d; 35e; 35g; 35h) of the third bearing element (20; 20a to 20h), in that the bearing portion (35; 35a; 35d; 35e; 35g; 35h) is arranged in a clamping-fitting or form-fitting manner in the receptacle (38; 38a; 66) of the gear housing (10), and in that the at least one intermediate element (32, 33; 46; 53; 58; 62, 63) produces a contact force on the contact element (28; 28a; 28b; 28d; 28e) in a direction of the drive shaft (2).

5. The drive unit as claimed in claim 1, characterized in that the stop (37; 65) is formed on the third bearing element (20; 20d; 20g; 20h).

6. The drive unit as claimed in claim 1, characterized in that the stop (48) is formed on the gear housing (10).

7. The drive unit as claimed in claim 4, characterized in that the intermediate element (32, 33; 53; 62, 63; 67) extends substantially in a direction running perpendicularly to the longitudinal axis (21) of the drive shaft (2).

8. The drive unit as claimed in claim 4, characterized in that the intermediate element (46; 58) extends substantially in a direction running parallel to the longitudinal axis (21) of the drive shaft (2).

9. The drive unit as claimed in claim 1, characterized in that the gear housing (10) has guide regions, which are formed by wall portions (39; 39a, 40; 40a; 40b), for the contact element (28; 28a; 28b; 28c; 28f; 28g), which guide regions extend perpendicularly to the longitudinal axis (21) of the drive shaft (2) and, with formation of a clearance fit, interact with side walls (41, 42; 51) of the contact element (28; 28a; 28b; 28c; 28f; 28g).

10. The drive unit as claimed in claim 1, characterized in that the gear housing (10) has a basic element (43) in which the receptacle (38; 38a; 66) for the bearing device (50) is formed, and in that a region of the receptacle (38; 38a; 66) is covered by a cover element (44) which is connectable to the basic element (43) and lies against the third bearing element (20; 20a to 20h) in regions.

11. The drive unit as claimed in claim 1, characterized in that the third bearing element (20; 20a to 20h) is designed as a single-part plastics injection molded part.

12. The drive unit as claimed in claim 1, characterized in that the third bearing device (20h) is formed integrally and is composed of a rubber-elastic material.

13. The drive unit as claimed in claim 1, characterized in that the drive shaft (2) is force-actuated in a direction of the gear element (13) by a supporting device (22) acting on an end surface of the drive shaft (2) in the axial direction.

14. A comfort drive in a motor vehicle, comprising a drive unit (100) as claimed in claim 1.

15. The drive unit as claimed in claim 1, characterized in that the gear housing (10) has a basic element (43) which is of shell-shaped design and in which the receptacle (38; 38a; 66) for the bearing device (50) is formed, and in that a region of the receptacle (38; 38a; 66) is covered by a cover element (44) which is connectable to the basic element (43) and lies against the third bearing element (20; 20a to 20h) in regions.

16. A drive unit (100), comprising a bearing device (50) for a drive motor (1) which interacts via a drive shaft (2), which is mounted at multiple points, with a gear element (13), comprising a first bearing element (3) which is arranged on a side of the drive motor (1) which is opposite the gear element, a second bearing element (4) which is arranged between the drive motor (1) and the gear element (13), and a third bearing element (20; 20a to 20h) which is arranged on a side of the gear element (13) which faces away from the drive motor (1), wherein the third bearing element (20; 20a to 20h) is arranged movably in a direction perpendicular to a longitudinal axis (21) of the drive shaft (2), and wherein the third bearing element (20; 20a to 20h) is accommodated in a receptacle (38; 38a; 66) of a gear housing (10), characterized in that the receptacle (38; 38a; 66) for the third bearing element (20; 20a to 20h) in the gear housing (10) is arranged with respect to the drive shaft (2) laterally next to the drive shaft (2) in a partial region in a circumferential direction of the drive shaft (2), and in that the third bearing element (20; 20a to 20h) has a contact element (28; 28a to 28h) which is arranged in constant bearing contact with the drive shaft (2), wherein the contact element (28; 28a; 28b; 28d; 28e) interacts with a stop (37; 48; 65) which limits a deflection of the contact element (28; 28a; 28b; 28d; 28e) in a direction running perpendicularly to the longitudinal axis (21) of the drive shaft (2), characterized in that the gear housing (10) has a basic element (43) which is of shell-shaped design and in which the receptacle (38; 38a; 66) for the bearing device (50) is formed, and in that a region of the receptacle (38; 38a; 66) is covered by a cover element (44) which is connectable to the basic element (43) and lies against the third bearing element (20; 20a to 20h) in regions.

* * * * *